United States Patent [19]
Gilbert

[11] Patent Number: 4,920,745
[45] Date of Patent: May 1, 1990

[54] INTERNAL COMBUSTION ENGINES
[75] Inventor: Wayne Ross Gilbert, City Beach, Australia
[73] Assignee: Orbital Engine Company Proprietary Limited, Balcatta, Australia
[21] Appl. No.: 175,425
[22] Filed: Aug. 11, 1987
[30] Foreign Application Priority Data
Apr. 9, 1984 [AU] Australia .............................. PG4492
[51] Int. Cl.$^5$ ............................................ F02B 27/02
[52] U.S. Cl. ....................................... 60/273; 60/310; 60/314
[58] Field of Search .................. 60/273, 310, 312, 314
[56] References Cited
U.S. PATENT DOCUMENTS
3,385,052  5/1968  Holtermann .......................... 60/314
3,726,092  4/1973  Raczuk ................................... 60/314

Primary Examiner—Douglas Hart
Attorney, Agent, or Firm—Armstrong, Nikaido, Marmelstein, Kubovcik & Murray

[57] ABSTRACT

A two stroke internal combustion engine (5) having a transfer port (9) and an exhaust port (8) in a cylinder (6) which are opened and closed in a timed relationship by the reciprocating movement of a piston (7). The exhaust port (8) communicates with an exhaust passage that is tuned to provide a pressure pattern in the exhaust passage that will create at the exhaust port (8) a predetermined pressure pattern while the exhaust port (8) is open. Coolant is supplied to the exhaust passage when the engine is subject to increasing transient load conditions, at engine speeds below the tuned speed, and at a controlled rate to establish a tuned state in the exhaust passage during the transient condition.

21 Claims, 5 Drawing Sheets

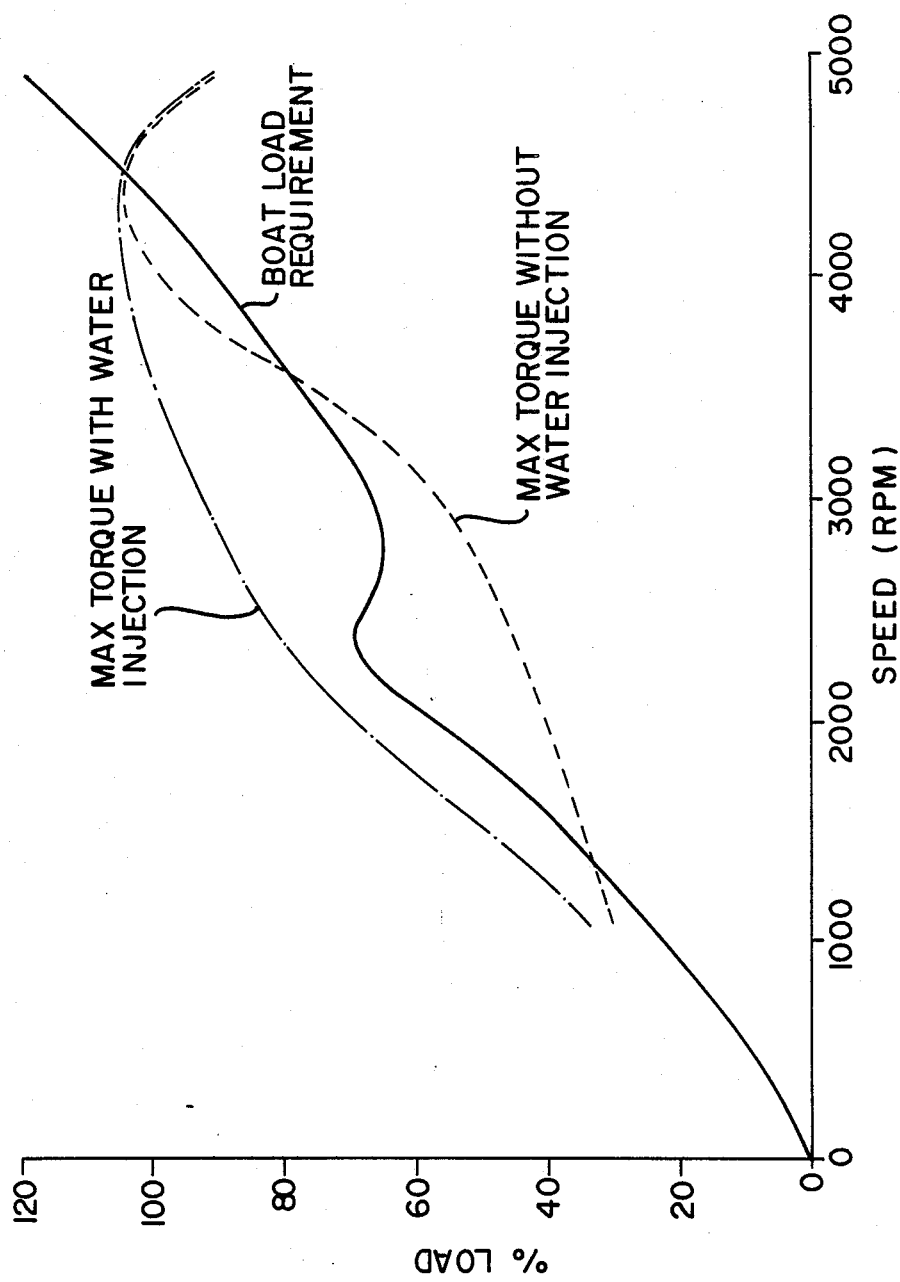

INTERNAL COMBUSTION ENGINES

This invention relates to the operation of internal combustion engines, and particularly to engines having a tuned exhaust system. The invention is applicable to many engine types, be they of the spark ignition or compression ignition type, configured with reciprocating, rotary, or rotary oscillating pistons. However, the invention is considered to have special applicability to two-stroke cycle reciprocating piston engines.

It is well known in the operation of inboard engines in pleasure boats to dispose of the engine's cooling water by dumping it in the exhaust pipe down-stream of the engine. This is a convenient route of disposal and also serves to cool the exhaust pipe as a fire safety measure.

It is also well known that engines generally and particularly two-stroke cycle engines benefit greatly by the use of what is commonly known as a "tuned exhaust system".

The basic mechanical simplicity of the two-stroke cycle crankcase-scavenged engine belies the complex transient gas flow characteristics inherent in the design. Engine performance can be greatly improved by utilizing a tuned exhaust system to create a favourable pressure-time history at the engine exhaust port, albeit over a relatively discrete speed range. Performance is compromised at some other speeds, due to unfavourable pressure fluctuations created by the same exhaust system at off-tune conditions. The tuned exhaust system only influences the gas flow characteristics during the period that the exhaust port of the engine is open.

An insight into the gas flow processes occurring can be gained by considering the operation of a two-stroke cycle crankcase-scavenged engine during one scavenge cycle. During the period from exhaust port opening (EPO) to transfer port opening (TPO), the exhaust products in the engine cylinder, being at high temperature and pressure, are exhausted through the exhaust port. Before the exhaust port closes, the transfer ports begin to open, and the fresh charge which has been compressed in the crankcase discharges through the transfer ports into the relatively quiescent engine cylinder. Direct loss of fresh charge out of the exhaust port, sometimes referred to as cross-over loss or short-circuiting, is controlled by the shape of and direction of delivery of the fresh charge through, the transfer ports. In most modern high-output two-stroke cycle engines, the scavenging process that takes place while both the exhaust and transfer ports are open result in some mixing of the fresh-charge and residual exhaust products, resulting in both dilution of the fresh charge with exhaust gas and a lowering of charge density due to the high temperature of the residual exhaust gas.

During the upwards stroke of the piston (after bottom dead centre), a number of factors combine to make it possible for the diluted fresh charge to escape through the exhaust port and to flow back through the transfer ports while these ports are open.

These factors include:
1. gas motion in the cylinder towards the exhaust port persists;
2. continued movement of the piston upwards displaces fresh charge out the exhaust port and transfer ports; and
3. after transfer port closure (TPC), continuation of charge loss is possible via the exhaust port.

The mass of fresh charge trapped at exhaust port closure (EPC) is indicative of the torque output of that particular engine cycle, and is determined by the charge pressure, temperature and charge purity.

The pressure at EPC is determined, firstly, by the overall back pressure levels inherent in the exhaust system, secondly, by the magnitude of any fluid-dynamic pressure fluctuations present at the port, and thirdly (although to a lesser extent) any over-pressure caused by the exhaust and transfer ports acting as a restricting orifice to out-flow. The temperature of the trapped charge is largely specified by the ambient temperature, the level of exhaust gas retention and heat transfer from the intake tract, crankcase, transfer-ports, cylinder liner, and piston etc. via forced convection and radiation.

As previously stated, engines, and particularly two-stroke cycle engines, can benefit from a tuned exhaust system, as such an exhaust system can improve the quality of the charge trapped in the cylinder at exhaust port closure. The function of the tuned exhaust system is to establish a low pressure at the exhaust port while that port is open and before the transfer port closes, and to establish a higher pressure at the exhaust port after the transfer port is closed and before the exhaust port closes.

A typical tuned exhaust system can be of the expansion chamber type, as illustrated in FIG. 1, which can be considered geometrically divided into five sections, an exhaust header pipe 10, a divergent cone 11, an exhaust chamber 12, a convergent cone 13, and an exit pipe 14. Upon the initial opening of the exhaust port, the sudden release of the pressure in the engine cylinder forms a wave front that travels at high speed through the exhaust port and along the exhaust system. Upon the wave front reaching the divergent cone 11, the expansion of the gas creates an inverted or negative wave front (sub-atmospheric) which travels back to the exhaust port. The relevant portions of the exhaust system, namely the header pipe 10, and divergent cone 11 are designed so the negative wave front will reach the exhaust port while it is open. In this way an increased pressure drop is provided through the exhaust port, to assist in scavenging of the exhaust gas from the cylinder. This negative wave front is commonly referred to as a "scavenging pulse".

As the initial wave front, somewhat reduced in strength, continues to move along the exhaust system, it encounters the converging cone 13, which functions somewhat as a closed end and causes the wave front to rebound as a positive wave front. Upon this positive wave front reaching the exhaust port, it provides a high pressure to resist the outflow of the gas from the cylinder, and may even reverse the flow back into the cylinder. The formation of the rebound positive wave is dependent on the design of the expansion chamber 12 and converging cone 13, and this design is selected so the returning positive wave front will reach the exhaust port after the transfer port is closed but before the exhaust port closes. The returning positive wave front is commonly referred to as a "plugging pulse".

A proper combination of these exhaust system parameters utilises the scavenge pulse between EPO and TPC to assist a fresh charge of air fuel/air mixture to be introduced into the cylinder, and a plugging pulse between TPC and EPC to retain this charge in the cylinder while producing a minor super-charging effect. A typical pressure-time history at the exhaust port created by an expansion chamber at the tuned speed is shown in FIG. 2 of the accompanying drawings.

The benefits available from this favourable exhaust port pressure-time history can be summarised as follows:

1. The transfer of fresh charge from the crankcase to the cylinder through the transfer port is assisted by the scavenging pulse. Extra charge, in addition to that pumped through the crankcase by the piston displacement, can be drawn into the cylinder by the low-pressure scavenging pulse. An increase in delivery ratio invariably results in an increase in charge purity due to the mixing process which occurs in the cylinder.

2. Charge loss through the exhaust port in the period from TPC to EPC is minimised by the plugging pulse. Under certain conditions, charge which has moved out through the exhaust port into the exhaust system may be forced back into the cylinder by this pulse. This supercharging effect (cylinder pressure at EPC above ambient) and subsequent increased trapping efficiency, results in both improved fuel consumption and higher power output.

3. The limitation of cross-over losses results in a large reduction in hydrocarbon emissions (generally the main source of hydro-carbon emissions in a homogenous-charge two-stroke engine is short-circuiting).

The timely arrival of these exhaust gas pressure pulses at the exhaust port is directly affected by the speed of the engine, the geometric length of the various sections of the exhaust system, and the speed at which the pressure pulses propagate within the exhaust system. Only at the tuned speed of the exhaust, do the pulses arrive at the exhaust port at the correct timing. Engine performance is considerably compromised at off-tune conditions. A characteristic of a two-stroke cycle engine fitted with a tuned exhaust system is that of a rather "peaky" torque curve, that is, with maximum torque occurring at the tuned speed of the exhaust system and torque dropping off rapidly on either side of that speed. Two regimes of off-tune conditions of engine operation should be appraised; above, and below, the tuned speed.

At speeds above the tuned speed, the scavenging pulse extends into the period from TPC to EPC and the plugging pulse arrives back at the exhaust port after exhaust port closure, thus being ineffective. These both contribute to charge loss through the exhaust port, and also lowers charge density at EPC. This results in poor fuel consumption and a rapid drop off in power above the tuned speed.

Below the tuned speed, the plugging pulse arrives at the exhaust port before the TPC interfering with the scavenging process, and promoting mixing of residual exhaust and fresh charge, both resulting in low charge purity.

The design of a tuned exhaust system is by necessity a compromise between performance at the tuned speed, and of that at off-tune speeds. The tuned length of the exhaust system determines the range of speeds for which beneficial pressure fluctuations occur. The rate at which the diverging cone 11 and converging cone 13 of the exhaust system change cross-section determines the magnitude and duration of any pressure fluctuations. In general there is a trade-off between magnitude and duration. A long duration wave tends to spread the engine torque band; whilst a short duration wave with high amplitude is best for maximum torque at the tuned speed. In general, the spread of torque required of an engine is the limiting criteria for tuned exhaust system design, and hence some trade-off in maximum output is made to ensure an adequately broad spread of torque.

The speed at which any pressure pulse propagates is determined directly by the velocity of the wave front. This velocity is the vector addition of the local fluid velocity and the acoustic velocity in the medium at the local fluid conditions. Typical full-load values for these velocities are 1500 m/s and 600 m/s respectively. The acoustic velocity is proportional to the square root of the fluid temperature. Modulation of the temperature of the gas in the exhaust system can, therefore, provide a means for control of the velocity of the wave front and hence control of pressure pulses at the exhaust port.

There has been proposed in U.S. Pat. No. 3,385,052 by Holtermann et al to increase the range of engine speed over which the exhaust system will function in a tuned state and thereby improve the engine performance over that increased speed range. One proposal by Holtermann et al is to mechanically vary the actual physical length of the exhaust passage in proportion to the engine speed, and another proposal is to control the temperature of the exhaust gas in relation to engine speed by injecting a variable quantity of water into the exhaust passage.

There is no specific disclosure in Holtermann et al as to how the exhaust passage could be constructed to provide the ability to mechanically vary the physical length thereof, or how that variation could be controlled in relation to engine speed. Although the construction of such a variable length exhaust system is possible, there would be considerable costs in the manufacture of such an exhaust system for use on conventional, marine or automotive engines. Further on such engines, the construction and actuating mechanism must be of a nature to be reliable in service and long lasting under the adverse conditions to which exhaust systems of marine and automobile engines are exposed.

Referring to the typical tuned exhaust system as illustrated in FIG. 1, the modulation of the tuned speed of the exhaust system may be effected mechanically by adjusting the length of either the header-pipe 10 or the mid-section 12 of the pipe between the divergent and convergent cones 11 and 13. The efficiency of the utilisation of the energy contained in the exhaust pulse towards increasing the performance of the engine by the exhaust system is compromised when only individual sections of the system are modified. To achieve maximum efficiency, each and every section of the exhaust system must be tailored to suit the tuned speed of the system. It is obviously not practical to achieve this in a mechanically adjusted exhaust system.

There is also proposed in Holtermann et al to provide an exhaust system which is constructed to operate in a tuned condition at high engine speeds and to deliver water into the exhaust system at a controlled rate in proportion to the engine speed to thereby regulate the temperature of the exhaust gas so as to operate in a tuned condition over the full range of engine speeds. As an alternative to delivering water into the exhaust system, there is proposed to control the supply of water to an external water jacket as a means of regulating the temperature of the exhaust gases to obtain a tuned state of operation of the exhaust system. There is no disclosure in relation to either of these proposals as to how the quantity of water will be controlled in relation to engine speed, apart from the general statement that the quantity of water delivered is inversely proportional to the engine speed, and that any suitable valve may be employed to control the rate of flow of the water.

The Holtermann et al proposal in relation to controlling the temperature of the exhaust gas to control the tuned state of the exhaust system is based on the belief that the volume of water required to be injected into the exhaust system is directly inversely proportional to the speed of the engine. Accordingly, Holtermann et al teaches that a tuned condition may be established in the exhaust system over the full engine speed range by appropriate control of the quantity of water injected into the exhaust system in a fixed relationship to the engine speed. The Holtermann et al proposal is thus based on the assumption that the temperature of the exhaust gas is substantially the same, irrespective of the engine speed, or that the temperature of the exhaust gas has a fixed linear relationship to engine speed. This assumption is incorrect in respect of the manner of operation of many forms of internal combustion engines, particularly engines that operate over variable speed and load ranges.

Typical examples of engines operating under such conditions are automotive and marine engines wherein the engine may operate under significantly varying loads at any particular speed. It will be appreciated that with varying loads at a selected engine speed, there will be varying fueling rates of the engine and as a consequence, varying exhaust gas temperatures. Accordingly, the proposals in Holtermann et al would not in practice achieve the desired result of having a tuned condition existing in the exhaust system under all engine operating conditions as the proposal to control the quantity of water injected into the exhaust system in relation to engine speed alone would not achieve the desired temperature conditions of the exhaust gas to maintain a tuned state in the exhaust system under all conditions.

It is also to be noted that Holtermann et al proposes the introduction of water into the exhaust system of the engine over the full speed range below the speed at which the exhaust system is naturally tuned. As the majority of engines operate in the low and medium speed ranges for a substantial portion of their operating time, it would be necessary to introduce water into the exhaust system throughout the majority of the period of operation of the engine, and consequently would amount to a substantial water consumption. This large water demand would not be a particular problem in marine engines where a plentiful supply of water is available, without the necessity of the vehicle carrying such water supply. However, in most other engine applications, and particularly in automobiles, a high water consumption by the tuned exhaust system would be a significant disadvantage due to the need to provide an onboard water supply. The necessity to carry such a storage of water in an automobile would hardly be commercially acceptable, particularly in view of the additional weight and the space it would occupy.

In many applications engines are subjected to varying load conditions and it is desirable for the engine to be capable of responding rapidly to such changes. Naturally, it is more difficult for the engine to respond to increases in load conditions than to decreases, as in the former, the engine power output must increase while the engine is under the increased load.

Various techniques are used to achieve improved engine response to increasing load condition based on enrichment of the fuel/air mixture provided to the engine. One mechanism to achieve this enrichment is the accelerator pump commonly incorporated in carburettors. The fuel/air mixture enrichment technique in responding to increases in load exhibits the disadvantage that although a power output increase is achieved, there may not be complete combustion of the enriched mixture resulting in increased fuel consumption and adverse exhaust emissions. These undesirable results of mixture enrichment are particularly serious in engines that must meet strict emissions control, such as apply in regard to automobiles.

The majority of marine outboard engines are fitted to planing type hulls. A planing hull exhibits a load-speed requirement which varies as a non-linear and non-monotonic function of speed. The load versus speed requirement for a typical planing hull pleasure craft is shown in the accompanying FIG. 1A. It can be seen that the torque requirement for operation in the displacement mode, that is when the hull speed is below that which allows the hull to plane, is proportional to speed to the power of about 1.8. After transferring to a planing mode, the torque requirement increases in proportion to the speed to the power of about 1.5. The transition from the displacement to planing mode is a critical region as far as power requirement for a boat engine is concerned The "hump" in the torque requirement as indicated in FIG. 1A influences two performance criteria which must be met by the marine engine, these being:

1. A maximum time required to accelerate the boat from rest to the rated speed of the boat is often specified by the manufacturer as a performance criteria of a boat and engine combination. The acceleration rate of the boat is proportional to the excess power that can be provided by the engine above the hull's requirements as indicated by the load speed curve. The time taken to accelerate the boat to and through the displacement-planing transition zone is usually a considerable portion of the overall acceleration time.

2. The single speed gearing usually provided between a marine engine and a boat propeller, and the characteristics of a propellor driving in a fluid-medium, dictate a narrow and limiting speed range in which the propellor, can operate for any given hull speed. Thus the torque requirement during the displacement-planing transition is also a limiting criteria in regard to powerplant sizing requirements.

The mid-speed range torque characteristics of an outboard marine engine are therefore of importance in selection of an optimally sized engine for a particular hull. The engine must have sufficient mid-range torque to accelerate the boat up and through the displacement-planing transition on the load-speed curve, and also be able to provide enough power to meet the acceleration requirements of the boat. The selective use of a tuned exhaust system to increase the mid-range torque of an engine is therefore desirable to permit use of a nominally smaller engine to achieve a boat performance comparable to that of a larger engine.

Having regard to the various factors discussed above in relation to engine performance it is the object of the present invention to provide a method and apparatus for improving the performance of an internal combustion engine by use of the benefits available from a tuned exhaust system in a controlled manner.

The present invention thus provides in one form a method of operating an internal combustion engine, preferably operating on the two stroke cycle, having a cylinder with a piston movable therein defining a combustion chamber, a charge inlet port and an exhaust port in said cylinder, said ports being arranged to be opened and closed in a timed relation to the movement of the piston in the cylinder so the inlet port is open during at least part of the time the exhaust port is open and closes before the exhaust port is closed. The method includes delivering the gaseous products of combustion from the cylinder to an exhaust passage communicating with the exhaust port downstream thereof, said exhaust port and exhaust passage being dimensionally proportioned to establish when the engine is operating in a first selected speed range a pressure pattern in the gas in the exhaust passage in response to opening of the exhaust port that will create at the exhaust port a pressure pulse of predetermined character before the exhaust port closes. Further in response to a predetermined engine operating condition existing when the engine is operating in a second speed range outside of said first selected speed range, the temperature of the gas in the exhaust passage is regulated in relation to the engine speed and load to establish a pressure pattern in said exhaust passage in response to opening of the exhaust port to create a pressure pulse of said predetermined character at the exhaust port before the exhaust port closes.

Preferably the temperature of the exhaust gas is regulated when predetermined load operating condition exists while the engine is operating in the second speed range. Under other load conditions within the second speed range, no regulation of the exhaust gas temperature is effected and so the engine operates with an off-tune exhaust system as the benefits arising from the admission of the coolant are not required to meet the load demand.

Alternatively, the temperature of the exhaust gas is regulated to create a tuned state in the exhaust system throughout the second speed range and at all loads encountered within the second speed range.

Conveniently the temperature of the exhaust gas in the exhaust passage is regulated by controlling the rate of admission of a coolant to the exhaust passage in relation to the engine operating condition.

When the second speed range is relatively narrow, coolant may be admitted at a fixed mass rate, however, over a wider speed range the mass rate of the coolant admitted is varied to achieve an appropriate acoustic velocity of the exhaust gas to engine speed relation to maintain the tuned state of the exhaust passage over the second speed range. The mass rate of coolant reduces with increase in engine speed as will be explained in more detail hereinafter.

An exhaust passage and exhaust port are normally constructed to achieve a tuned state at a select engine speed, such as the speed at which the engine develops maximum output. However, an exhaust system when operating at speeds near the natural tuned speed, can provide gains in power output of the engine.

Although the operation of the engine with the exhaust system in a tuned state is beneficial in improving the power output when the engine is operating in the low or medium load range, similar increases in power may be achieved by increases in fueling rate without the necessity of establishing a tuned condition in the exhaust system. Accordingly, in some applications of internal combustion engines, such as in automobile engines, it is on balance desirable at some operating conditions to conserve coolant consumption by the exhaust system and to achieve the required additional performance by increases in the fueling rate. This is particularly advantageous when the engine is operating under relatively steady load conditions. However, it is considered desirable for an engine to be capable of responding rapidly to transient load conditions and this response can be contributed to by selectively introducing coolant to the exhaust system to establish a tuned state whilst the engine is subject to an increasing transient load condition. The use of the introduction of coolant to the exhaust system to establish a tuned condition only during such transient load condition would of course substantially contribute to a reduction in coolant consumption.

The widely used outboard marine engine is usually of the two-stroke cycle type and the performance of such engines can be substantially improved by a tuned exhaust system. The performance and spread of power of two-stroke cycle multi-cylinder engines with merged exhaust systems can be significantly improved by using favourable pressure fluctuations created in the exhaust system by pressure pulse of one cylinder to enhance charging of another cylinder. The capacity to utilise this affect is dependent on the number and the firing order of the cylinders in the engine. Two-stroke cycle marine engines usually have symmetric timings, and hence exhaust tuning depends solely on the number of cylinders. Typically three and six cylinder engines benefit significantly from the pressure fluctuations in the merged exhaust system and so have a relatively broad power band. Four and eight cylinder engines experience a lesser benefit. One and two cylinder engines typically have higher specific outputs than engines with other cylinder geometries but have a narrow power band.

The application of the present invention to a two cylinder outboard marine engine can be used to provide a broader power band comparable with a three cylinder engine while retaining the simplicity and high specific power output of a two cylinder engine. However, benefits in power output can be achieved with engines of any number of cylinders as the exhaust system can be tuned to give a higher specific power output and the normal sacrifice in mid-power range performance can be corrected by the control of the exhaust gas temperature. In particular the temperature control can be used to increase the engine power when required to power a boat through the displacement-planing transition. This ability to increase engine power output in the lower area of the power range enables the down-sizing of the engine for any particular boat and so under cruising operation the engine operates at a higher point in the engine power range where engines are usually more fuel efficient.

The invention will be more readily understood from the following description of the application of the invention with reference to the accompanying drawings; wherein:

FIG. 1A is boat-load curve for a planing hull boat.

Figure 1:
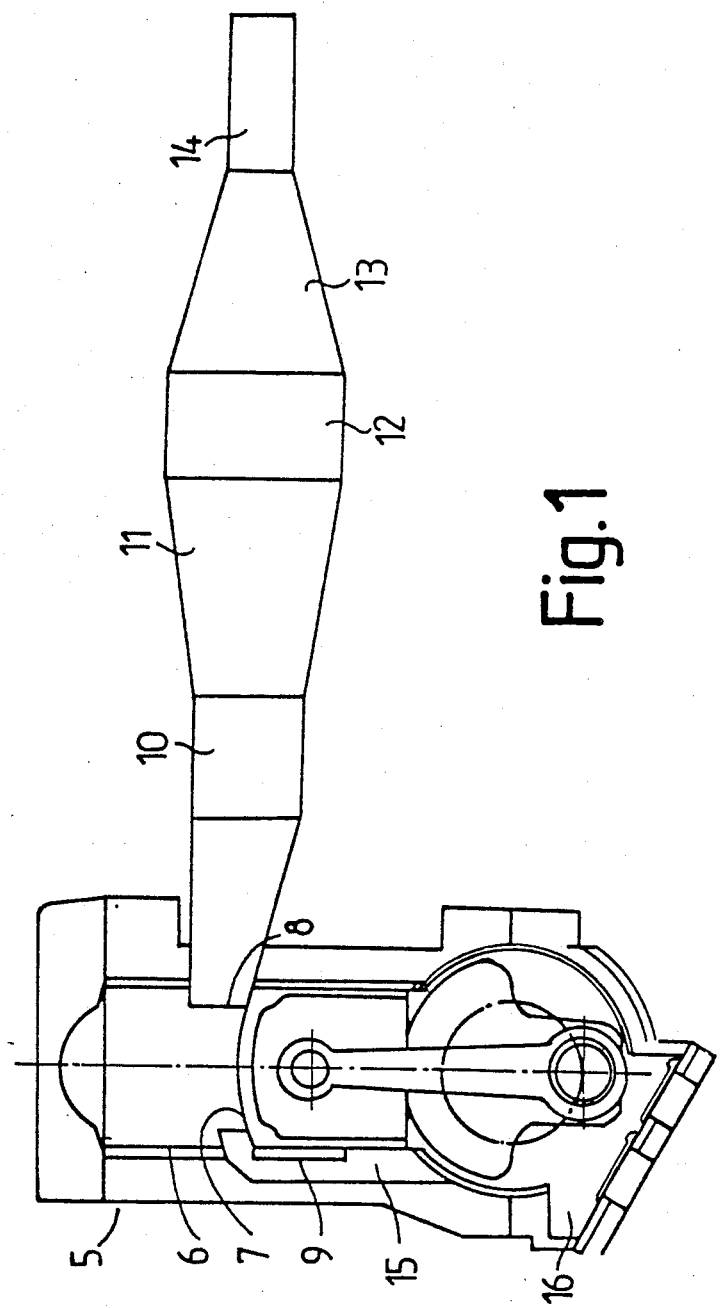
FIG. 1 shows diagrammatically a typical two-stroke cycle engine with a tuned exhaust system.
Figure 2:
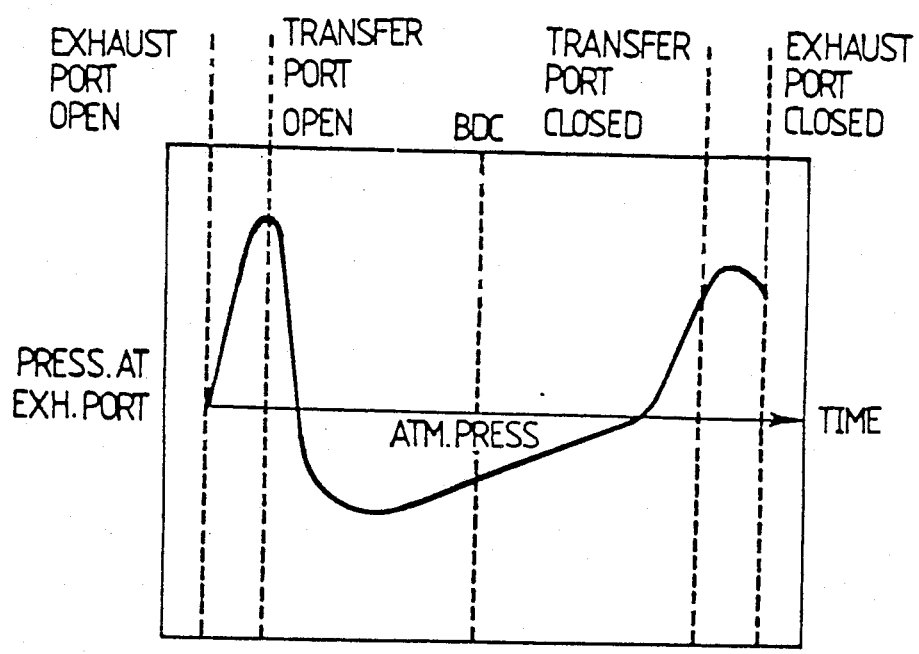
FIG. 2 shows the pressure-time history at the exhaust port of an engine fitted with a tuned exhaust system, and when the engine is operating at the tuned engine speed.

Referring to FIG. 1 the conventional two stroke engine 5 has a cylinder 6 in which the piston 7 reciprocates. The wall of the cylinder 6 has formed therein an exhaust port 8 and a transfer port 9. The transfer port 9 communicates through the passage 15 with the crankcase 16. Induction ports 17 in the crankcase are provided with reed valves 18. The engine operates on the conventional crankcase scavenged two stroke cycle and shall not be described in detail as it is common knowledge to those skilled in the art.

The transfer port 9 and exhaust port 8 are opened and closed by the piston 7 as it reciprocates in the cylinder 6, and a typical port timing is

|  | Crank Angle Degrees |
| --- | --- |
| Bottom Dead Centre | 0 |
| Transfer Port Closed | 60 |
| Exhaust Port Closed | 90 |
| Top Dead Centre | 180 |
| Exhaust Port Opens | 270 |
| Transfer Port Opens | 300 |

Extending from the exhaust port 8 is an expansion chamber type exhaust system designed to provide tuned performance as previously described. The design criteria of such an exhaust system to provide tuned performance at a selected engine speed is well known and the general construction thereof has previously been described herein and will not be further described here.

Typical dimensions of such an exhaust system having a tuned speed of 4000 R.P.M. are

|  | Length | Dia | Angle |
| --- | --- | --- | --- |
| Header Pipe (10) | 385 m$\mu$ | 54.7 m$\mu$ | 0° |
| Diverging Cone (11) | 505 |  | 3° Half Angle |
| Expansion Chamber (12) | 117 | 107.7 | 0° |
| Converging Cone (13) | 316 |  | −6° Half Angle |
| Exit Pipe (14) | 262 | 33.9 |  |

An exhaust system of this design would provide enhanced torque output over the narrow engine speed range centred on 4000 R.P.M. and of the order of 3500 to 4600 R.P.M.

As previously explained, changes in the exhaust gas temperature will vary the acoustic velocity of the exhaust gases, and the pressure-time pattern of the gas may be controlled by varying the gas temperature. Thus by varying the gas temperature by the introduction of controlled amounts of coolant, such as water, to the exhaust system the engine speed range over which the exhaust system will perform as a tuned system may be extended downwardly.

At engine speeds below the natural tuned speed of the exhaust system, water introduced to the exhaust near the exhaust port 8 enables the temperature of the exhaust gas to be lowered through evaporation of the water droplets by heat transfer from the gas. Modulation of the exhaust gas temperature to achieve a commensurate modulation of the acoustic velocity is effected by modulation of the mass flow of water into the exhaust system. Tuned exhaust condition can thus be established at any selected engine speed by controlling the exhaust gas temperature to give an acoustic velocity so the exhaust system is in tune.

It will be appreciated that when the pressure-time pattern of the exhaust gas is controlled in this manner, for a selected engine speed, other than the natural tuned speed of the exhaust system, the scavenging pulse and plugging pulse as previously discussed will arrive at the exhaust port in the desired relation to the time of the opening and closing of the transfer and exhaust ports of the engine to enhance the engine power output at that selected speed.

Figure 3:
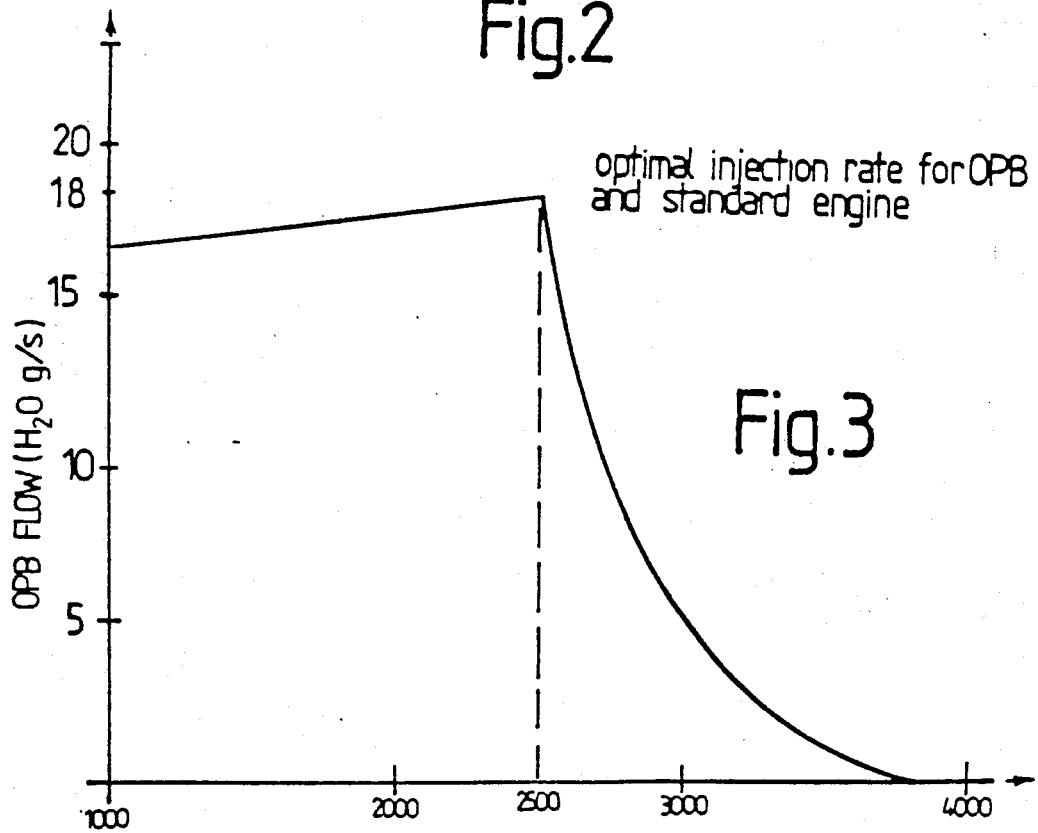
FIG. 3 is a plot showing the amount of water injected into the exhaust system as a function of engine speed.

A typical water mass flow to engine speed relationship is shown in FIG. 3 for an engine having an exhaust system designed to a natural tuned speed of 4000 R.P.M.

Figure 4:
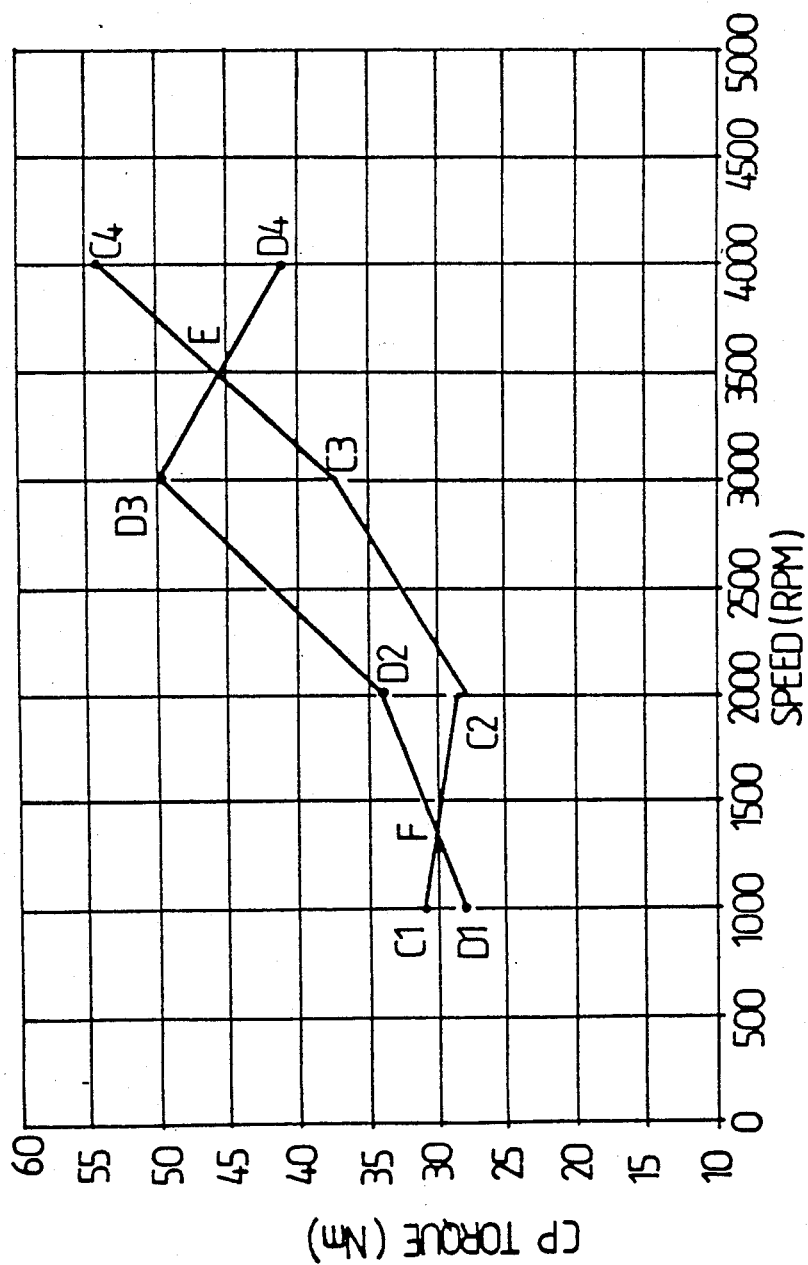
FIG. 4 shows respective plots of engine torque at wide open throttle-against engine speed for the engine with and without water injection into the exhaust system.

In this particular exhaust system, over the engine speed range of 1000 R.P.M. to 2500 R.P.M. the gas cannot be cooled sufficiently to bring the system into a tuned state due to the temperature of the water supply not being sufficiently below the gas temperature required to achieve a tuned state. Although a true tuned state may not be achieved throughout this lower speed range the cooling effect achieved does bring the exhaust system closer to the tuned state and a consequent improved engine performance is achieved as seen in FIG. 1A and 4. Between engine speeds 2500 R.P.M. and about 3800 R.P.M. the injection rate varied from 18 g/sec to zero along the line shown. Above 3500 R.P.M. there is no need for water to be added to achieve an approximately tuned state in the exhaust system. Although the natural tuned speed of the exhaust system is 4000 R.P.M. it is considered that 3800 R.P.M. is sufficiently close to the tuned speed that no modification of the sonic characteristics of the exhaust gas was required beyond that speed and hence water injection is not required. At and above 4000 R.P.M. water injection would have a detrimental effect.

If the exhaust gas temperature is assumed to be a constraint, independent of engine operating conditions other than speed, then the rate of decrease of the supply of water with engine speed increase to maintain a tuned state of the exhaust system is a straight line. However, in practice, this is not so, and other engine operating conditions are required to be taken into consideration. In practice the exhaust gas temperature may rise with engine speed, and also with increased engine load. Also changes in ignition timing will influence exhaust gas temperature. The efficiency of the engine cooling system, particularly any external exhaust system cooling, and variations therein with engine speed are also relevant.

These factors account for the somewhat exponential form of the plot of water rate against speed in FIG. 3, which was developed for the particular engine from test results.

It will be appreciated from the plot in FIG. 3 that, for a particular engine, the exhaust system can be brought into a tuned state at any selected speed by delivering water into the exhaust system at the appropriate rate. Accordingly, in any specific engine application, the operating condition may require additional power in a particular speed range, and this can be met by admitting the necessary quantity of water to the exhaust system to bring it into a tuned state for that speed range, and so increase the engine torque for that speed range.

FIG. 4 shows comparative torque outputs for an engine equipped with an exhaust system having a natural tuned speed of 4000 R.P.M. with and without controlled water injection into the exhaust systems. The two plots were obtained by taking respective readings at 1000, 2000, 3000, and 4000 R.P.M. with the engine running with wide open throttle Curve C1, C2, C3, C4 shows the results for the engine without any water injected into the exhaust system. Curve D1, D2, D3, D4 shows the results with a controlled rate of water injection to provide water flow rates of 18 g/sec at 1000 R.P.M., 18 g/sec at 2000 R.P.M., 9 g/sec at 3000 R.P.M. and 18 g/sec at 4000 R.P.M It should be appreciated that D4 is not meant to be a point in real life operation of an engine, as at 4000 R.P.M., the tuned speed of the exhaust system, there would in practice be no water injected into the exhaust system. Point D4 is shown to demonstrate the adverse effect of water injection at the tuned speed of the exhaust expansion chamber. The correct operation of the engine with the required variation of the quantity of water delivered to the exhaust would be generally in accordance with curve C1, F, D2, D3, E, C4.

As previously referred to marine engines usually have a requirement for a high torque during the period when driving a planing hull from an non-planing to a planing condition. This is normally required when the motor is running below the tuned speed of the exhaust system such as in the range of 1500 to 1000 R.P.M. below the tuned speed. Accordingly, if water is supplied to the exhaust system in that speed range at a rate to establish tuned conditions, additional torque will be available to bring the hull onto the plane quicker. This ability to increase the engine performance may also permit the use of a large pitch propeller to improve the top speed of the hull without sacrifice in initial 'pick-up' performance.

In FIG. 1A the torque-speed relation of the engine in the tuned and untuned state is plotted against a typical boat load-speed requirement for a planing hull. This clearly illustrates that operating with a tuned exhaust system at least in the mid-speed range will substantially improve the boats performance in transiting from displacement to planing operation.

Suitable sensor means are provided to determine when engine operating conditions are such that water is required to be introduced to the exhaust system. The sensor means may be responsive to engine speed, throttle position, rate of charge of engine speed or throttle position, or any combination of these engine perimeters.

The rate of introduction of water to the exhaust system may be fixed if it is to be introduced at only one narrow speed range of the engine, or a number of rates may be available, one for each speed range wherein additional power is to be provided. The various rates of water supply may be achieved by providing respective sized nozzles for each rate, by a variable size nozzle, or by varying the pressure of the water supplied to the nozzle, or any appropriate combinations thereof.

A manufacturer of engines can thus use the present invention to achieve different forms of improved performance, such as:

1. Incorporated onto an existing engine with its existing exhaust system, the invention offers an additional or a broader power band with the same normal maximum output, and exhibits considerable gains in fuel economy in the previous off-tune speed range, with no change at the natural tuned speed of the exhaust system.

2. For an existing engine, with a redesigned exhaust system, the invention can achieve a higher specific output at a selected speed range with the output otherwise of the same nature as the original engine. This would exhibit benefits in fuel economy throughout the load/speed ranges.

As will be appreciated from FIG. 4, for an engine that idles at a speed of no greater than 1000 R.P.M., such as, for instance, in the speed range of 800 to 1000 R.P.M., the water will be introduced into the exhaust over a limited speed range which has a lower limit somewhat greater than the idling speed of the engine, and, as illustrated in FIG. 4, at least approximately 1300 R.P.M. The lower end of the limited speed range over which water is introduced into the exhaust will be generally at least 1.2 times the idling speed, and preferable is in the range 1.2 to 1.6 times of the idling speed, and not more than 1800 R.P.M.

As indicated hereinabove, the timely arrival of exhaust gas pressure pulses at the exhaust port is directly affected by, among other factors, the speed at which the pressure pulses propagate within the exhaust system. Thus in addition to engine speed, the quantity of water admitted to the exhaust will be also dependent upon engine load, since the exhaust temperature will vary with engine load. To achieve this two-function variation, it is preferred to provide an additional input into the water control system based on the engine load or exhaust temperature, and to operate a single water supply control in response to both engine speed and load (or exhaust temperature), or to provide respective control systems to operate in tandem to regulate the water supply to the exhaust system.

It is preferred in the present invention that the natural tuned speed of the exhaust system is approximately the speed of the maximum engine torque, or of maximum engine horsepower, and that a controlled supply of coolant is provided to the exhaust system over a limited range of speed below the natural exhaust system tuned speed. At relatively low engine speeds the power required of the engine during normal operations is generally relatively low, and it is thus unnecessary to have the exhaust system operating in a tuned condition at such low speeds. The water supply may thus be terminated at lower engine speeds where the highest water consumption would be experienced and as is experienced in the system of the Holtermann et al U.S. Pat. No. 3,385,052, previously referred to.

Another embodiment of the present invention, which is particularly applicable to engines having a quite limited water supply, is to introduce a controlled amount of water into the engine exhaust system only under certain transient load conditions, so as to bring the exhaust system during such transient load conditions into a tuned state, to thereby significantly increase the power output during transient operation. Such conditions could be, for instance, cold start operation of the engine or periods of maximum acceleration of the engine. A microprocessor control system, of the nature described in U.S. Pat. No. 4,561,405 and U.S. patent application Ser. No. 894,459, filed Aug. 5, 1986, may be utilised to sense the aforesaid transient conditions, and to suitably control the water introduction into the exhaust system. The disclosures of the aforesaid patent and patent application are hereby incorporated by reference for the teachings of such control sensing and control systems therein.

It will normally be preferred to have the water control system for a given engine to be set up so as to introduce no water into the exhaust system at or above the tuned speed of the exhaust system, as water injection at such speeds will normally result in an adverse effect, as illustrated by FIG. 4 of the accompanying drawings.

It is normally preferred that the limited engine speed range over which water is introduced into the exhaust system be a range of at least 1000 R.P.M., preferably of at least 1500 R.P.M., and more preferably of at least 1800 R.P.M.

Figure 5:
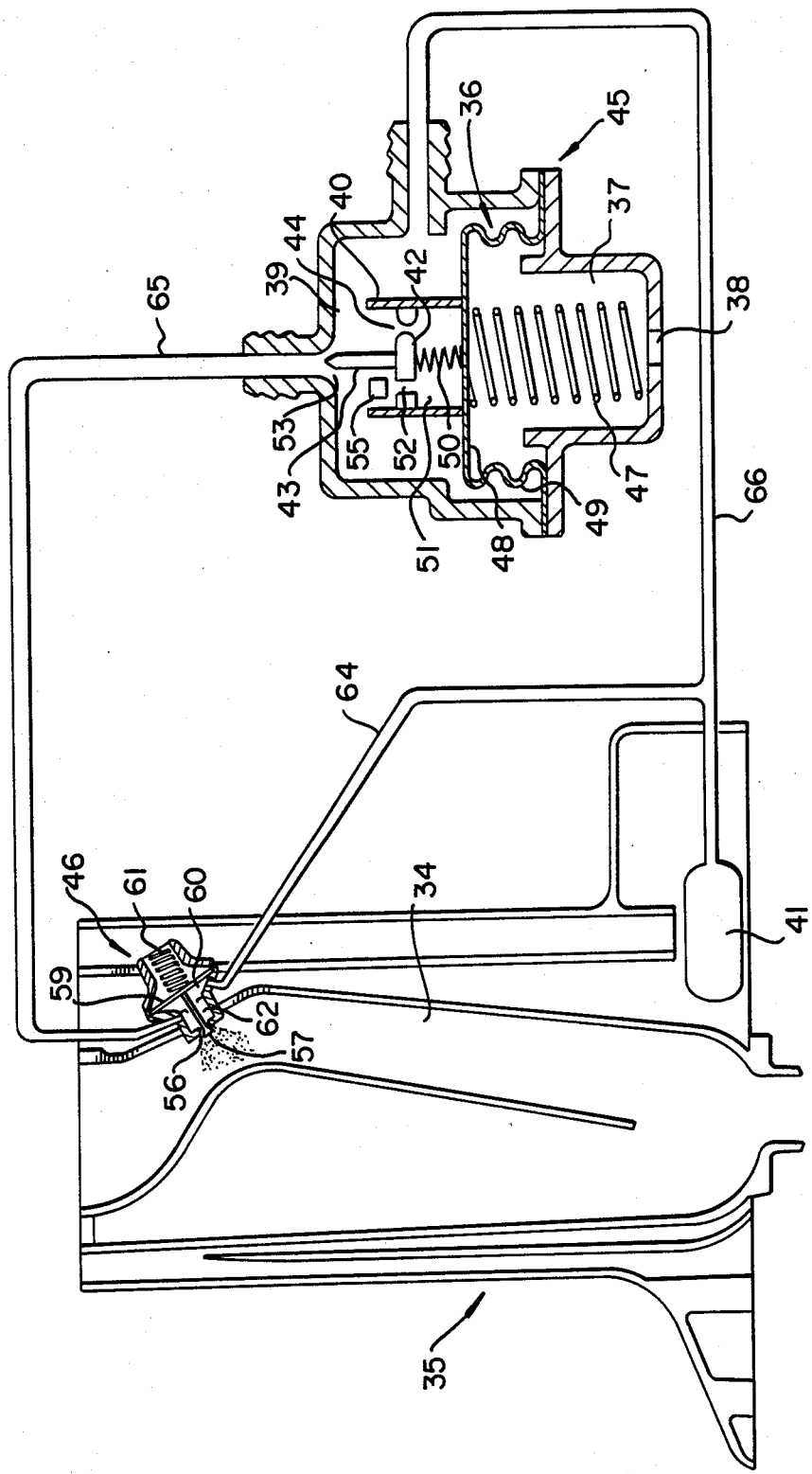
FIG. 5 is a diagramatic view of a leg of an outboard marine engine including portion of the engine exhaust system and the exhaust temperature control mechanism.

There is illustrated in FIG. 5 a mechanism for sensing transition conditions in an engine and regulating the rate of water supply to an engine exhaust system. The conventional outboard marine engine leg 35 has a conventional exhaust passage 34 and a conventional water coolant pump 41 of the type wherein the water pressure increases with increase in engine speed. The flow control device 45 controls the water supplied to the metering valve 46 from the engine water pump 41.

The water flow control device 45 comprises a housing divided by the diaphragm 36 into a water chamber 39, communicating by the conduit 66 with the delivery of the pump 41, and an air chamber 37, communication with atmospheric air via the constantly open port 38. Located within the air chamber 37 is a spring 47 which applies a force to the diaphragm 36 to move it in an upward direction as viewed in FIG. 5. The diaphragm 36 includes rigid central base portion 48 and a flexible peripheral portion 49 which may expand and contract to permit the central base portion 48 to move up and down under the influence of the resultant force thereon from the spring 47 and the pressures in the water chamber 39 and air chamber 37.

The cylinder 40 is rigidly secured to the central base portion 48 of the diaphragm and has a piston 42 mounted therein to reciprocate in a vertical direction with a spring 50 interposed between the piston 42 and the base portion 48 of the diaphragm. The spring 50 urging the piston 42 in an upward direction as viewed in FIG. 5.

The piston 42, cylinder 40 and base portion 48 of the diaphragm define a control chamber 51, which is in communication with the water chamber 39 via the fixed size orifice 44 and the port 52 controlled by the check valve 55. The needle valve 43 is rigid with the piston 42 and co-operates with the port 53 to control the flow of water therethrough from the water pump 41 to the metering valve 46.

Under steady operating conditions of the engine a steady water pressure will exist in the water chamber 39 and the port 53 will be closed by the needle valve 43. In this condition both the water chamber 39 and control chamber 51 are filled with water at the same pressure and the force exerted by the spring 50 on the piston 42 will seat the needle valve 43 in the port 53 to prevent the flow of water to the metering valve 46.

In the event of a gradual increase in engine speed the resultant increase in water pressure from the pump 41 will cause a gradual downward movement of the diaphragm 36 until the force applied by the spring 47 balances the force applied by the water pressure in the water chamber 39. The orifice 44 is sized so that during such gradual movement of the diaphragm 36 water can flow through the orifice 44 at a rate to maintain the control chamber 51 filled with water as the diaphragm 36 and the cylinder 40 move downward, and so the spring 50 will retain the needle valve 43 seated in the port 53, and no water will flow to the metering valve 46.

When the engine speed is rapidly increased there will be a rapid increase in pressure in the water chamber and a resultant rapid downward movement of the diaphragm 36 and cylinder 40. The restriction to the flow of water presented by the orifice 44 will prevent the water from flowing into the control chamber 51 at a rate to permit the piston 42 to move upwardly in the cylinder 40 under the action of the spring 50 at the same rate as the cylinder is moving downwardly and so the piston and needle valve 43 are caused to also move downwardly. As a result of this downward movement of the cylinder, piston and needle valve, the port 53 is opened and water will flow to the metering valve 46.

Upon the diaphragm 36 and cylinder 40 adopting a new steady position, the continuation of the flow of water from the water chamber 39 to the control chamber 51 through the orifice 44 and the force derived from the spring 50, will cause the piston 42 and needle valve 43 to move upwardly until it again closes the port 53 and so terminate the water flow to the metering valve 46. The period of time that the port 53 is open following a rapid increase in the pressure of the water from the pump 41 is determined substantially by the size of the orifice 44, the force applied to the piston by the spring 50, and the extent of movement of the diaphragm 36 and cylinder 40. Accordingly, by appropriate selection of the rate of the spring 50 and the characteristics of the orifice 44, the period of supply of water to the metering valve 46 per unit of movement of the diaphragm is set.

Any decrease in pressure of the water supplied by the pump 41 to the water chamber 39, irrespective of whether it is a gradual or rapid decrease, will cause the diaphragm 36 and cylinder 40 and result in a rise in pressure of the water in the control chamber 51, once the needle valve 43 is seated in the port 53. This rise in pressure will cause the check valve 55 to open to permit a free transfer of water from the control chamber 51 to the water chamber 39 while the diaphragm and cylinder move upwardly.

The flow control device 45 as above described provides the control to enable water from the water pump 41 to be delivered to the metering valve 46 in response to an increasing transient load on the engine, and to terminate that delivery when the engine is operating under a steady or decreasing load.

The metering valve 46 has an orifice 56 and a co-operating valve element 57 connected by the rod 58 to the diaphragm 59. The chamber 60 on one side of the diaphragm 59 is in direct communication with the pressure side of the water pump 41 via the conduit 64 so the pressure in the chamber varies as the water pressure varies in response to engine speed, that is the pressure increases as the engine speed increases. The spring 61 acts on the diaphragm 59 to oppose the water pressure in the chamber 60, so the valve element 57 will progressively restrict the orifice 56 as the engine speed increases. The conduit 65 supplies water to the cavity 62 from the port 53 of the control device 45.

As the supply of water to the metering valve 46 is controlled in response to the rate of charge of the engine speed, and the degree of opening of the orifice 56 is approximately inversely proportional to the engine speed, the delivery of water to the exhaust system is controlled to occur only under selected transient engine conditions, and the quantity of water delivered is controlled for the particular engine speed to establish a tuned condition in the exhaust system.

It will thus be appreciated that the combined use of the water flow control device 45 and the metering valve 46 as above described will establish a tuned condition in the exhaust system during an increasing transient load condition to thereby increase the engine output and hence provide a more rapid engine response to said increasing load. During generally steady load conditions, the engine may operate with an untuned exhaust system. This enables the engine to be constructed of a size and performance to meet generally steady load conditions, and to provide the additional power required for rapid response to the increasing transient loads by controlling the exhaust gas temperature to give a tuned condition in the exhaust system.

The invention is most applicable to marine engines, inboard and outboard, and particularly water cooled marine engines as there is then a readily available supply of water at an appropriate pressure. However, the invention is also applicable elsewhere, such as on an engine driving an agricultural irrigation or fire fighting water pump. Also, there are an increasing number of light and ultralight aircraft using air cooled two stroke engines which would benefit from a power boost during take-off and initial climb. Sufficient water could be carried for this purpose, the supply being exhausted during the first few minutes of operation.

It is preferred to reduce exhaust gas temperatures by water injection into the exhaust gas, but it will be clear that any means of reducing the exhaust gas temperature will provide the desired control of acoustic velocity.

While it is believed easier and more practical to control the acoustic velocity of the exhaust gases by cooling, such as by the water injection described above, it is also possible to use a tuned length exhaust system having a greater time interval before a given return pressure fluctuation reaches a given point, such as an exhaust port. The exhaust gases in that instance can be heated to increase acoustic velocity and thus increase the speed of travel of the return pressure fluctuation, with the amount of exhaust gas heating varying with the engine speed so as to optimise the characteristics of the return pressure fluctuation. The heating could be accomplished by various methods ranging from external heating coils or control of water flow for water-cooled jacketed exhaust systems to the establishment of a flame in the exhaust gases by the introduction of fuel thereto. The important feature of this invention is thus to control the temperature of the exhaust gases, and thus the acoustic velocity of the exhaust gases, so as to control the time of arrival, magnitude and/or duration of returning pressure fluctuations at a given point, such as the exhaust port. Any means of achieving such temperature control should result in the desirable and beneficial features of the present invention.

Although the present invention is most applicable to conventional two-stroke cycle reciprocating or rotary engines where valves are not fitted to the exhaust ports (the valves' function being performed by the pistons) the invention could also be advantageously applied to 4-stroke cycle engines or 2-stroke cycle engines with exhaust valves. This is because of the inventions ability to control the scavenging effect of the low pressure pulse at the exhaust port.

Although the invention is most applicable to engines with one or two combustion chambers exhausting into a tuned length expansion chamber, an advantage (although diminished) may also be obtained by its use with an engine with a pulse charged exhaust system, such as is found on some multi-cylinder two-stroke cycle engines, especially those with three or more cylinders.

I claim:

1. A method of operating an internal combustion engine having a cylinder with a piston movable therein defining a combustion chamber, a charge inlet port and an exhaust port in said cylinder, said ports being arranged to be opened and closed in a timed relation to the movement of the piston in the cylinder so the inlet port is open during at least part of the time the exhaust port is open and closes before the exhaust port is closed, the method including the steps of: delivering the gaseous products of combustion from the cylinder to an exhaust passage communicating with the exhaust port downstream thereof, said exhaust passage being dimensionally proportioned to establish when the engine is operating in a first selected speed range a pressure pattern in the gas in the exhaust passage in response to opening of the exhaust port that will create at the exhaust port a pressure pulse of predetermined character before the exhaust port closes, and, in response to a predetermined engine operating condition existing when the engine is operating in a second speed range outside of said first selected speed range and having a lower limit of 1.6 times the normal idle speed of the engine, regulating the temperature of the gas in the exhaust passage in relation to the engine speed and load to establish a pressure pattern in said exhaust passage in response to opening of the exhaust port to create a pressure pulse of said predetermined character at the exhaust port before the exhaust port closes when the engine is operating in said second speed range outside of said first selected speed range.

2. A method of operating an internal combustion engine as claimed in claim 1 wherein the exhaust gas temperature is regulated to create said character of pressure pulse in response to predetermined engine load conditions on the engine when operating in said second speed range.

3. A method of operating an internal combustion engine as claimed in claim 1 wherein the exhaust gas temperature is regulated to create said character of pressure pulse at all loads within the second speed range.

4. A method of operating an internal combustion engine as claimed in claim 1, wherein the exhaust gas temperature is regulated to create said character of pressure pulse in response to a predetermined rate of increase of load on the engine when operating in said second speed range.

5. A method of operating an internal combustion engine as claimed in any one of claims 1 to 4, wherein the lower limit of said second speed range is in the range of 1300 RPM to 1800 RPM.

6. A method of operating an internal combustion engine as claimed in claim 4, wherein coolant is admitted to the exhaust passage to regulate the temperature of the exhaust gas therein, said coolant being admitted at a rate related to the engine speed, said admission of coolant being initiated in response to the existence of a predetermined rate of increase in engine load and is maintained for a selected time period.

7. A method of operating an internal combustion engine as claimed in claim 6, wherein the admission of coolant is maintained for a time period proportional to the initial rate of change of the engine load.

8. A method of operating an internal combustion engine as claimed in claim 4, 6 or 7, wherein said second speed range is from 1.2 times the normal engine idle speed to the lower limit of said first selected speed range.

9. A method of operating an internal combustion engine as claimed in any one of claims 1 to 4, wherein the exhaust passage is dimensionally proportioned so said pressure pulse is at a pressure below the pressure existing in the combustion chamber at the time the pressure pulse arrives at the exhaust port, and arrives at the exhaust port before the inlet port has closed.

10. A method of operating an internal combustion engine as claimed in claim 9 wherein said pressure of the predetermined pressure pulse is below atmospheric pressure.

11. A method of operating an internal combustion engine as claimed in any one of claims 1 to 4, wherein the exhaust passage is dimensionally proportioned so the pressure pulse is at a pressure above the pressure existing in the combustion chamber and arrives at the exhaust port after the inlet port closes and before the exhaust port closes.

12. An internal combustion engine having a cylinder with a piston movable therein defining a combustion chamber, a charge inlet port and an exhaust port in said cylinder, said ports being arranged to be opened and closed in a timed relation to the movement of the piston in the cylinder so the inlet port is open during at least part of the time the exhaust port is open and is closed before the exhaust port is closed, and an exhaust passage communicating with the exhaust port downstream thereof, said exhaust passage being dimensionally proportioned to establish when the engine is operating in a first selected speed range a pressure pattern in the gas in the exhaust passage in response to opening of the exhaust port that will create at the exhaust port a pressure pulse of predetermined character before the exhaust port closes, means operable when the engine is operating in a second speed range outside of said first selected speed range and having a lower limit of 1.6 times the normal idle speed of the engine to regulate the temperature of the gas in the exhaust passage in relation to the engine speed and load to establish a pressure pattern in said exhaust passage in response to opening of the exhaust port to create a pressure pulse of said predetermined character at the exhaust port before the exhaust port closes, and activator means responsive to a predetermined engine operating condition to activate said means to regulate the exhaust gas temperature when the engine is operating in said second speed range outside of said first selected speed range.

13. An internal combustion engine as claimed in claim 12 wherein said activator means is responsive to a predetermined engine load condition.

14. An internal combustion engine as claimed in claim 12 wherein said activator means is a responsive to all load conditions within said second speed range.

15. An internal combustion engine as claimed in claim 12 wherein said activator means is responsive to a predetermined rate of increase of load on the engine when operating in second speed range.

16. An internal combustion engine as claimed in claim 15, wherein said regulator means is adapted to admit coolant to said exhaust passage at a rate proportional to the engine speed, and said activator means is adapted to initiate the admission of coolant in response to a predetermined rate of increase in engine load and to maintain said admission of coolant for a selected time period.

17. An internal combustion engine as claimed in claim 15 or 16, wherein said activator means is adapted to maintain said admission of coolant for a time period proportional to the initial rate of change of engine load.

18. An internal combustion engine as claimed in claim 16, wherein said regulator means comprises a valve control port communicating with the exhaust passage to admit coolant thereto when said port is open, and means to control the degree of opening of said port proportional to the engine speed.

19. An internal combustion engine as claimed in claim 15, including pump means driven by the engine to provide coolant to the regulator means at a pressure proportional to engine speed, for admission to the exhaust passage, and the activator means includes a valve means controlling the supply of coolant from the pump means to the regulator means, said valve means being adapted to open to permit the supply of coolant to the regulator means in response to a rate of increase of pressure of the coolant from the pump means above a predetermined value.

20. An internal combustion engine as claimed in claim 19, wherein said regulator means comprises a valve control port communicating with the exhaust passage to admit coolant thereto when said port is open, and means to control the degree of opening of said port proportional to the engine speed.

21. An internal combustion engine as claimed in claim 19 or 20, wherein the valve means includes a valve element normally closing a port through which coolant is supplied from the pump to the regulator means for delivery to the exhaust passage, actuator means to displace said valve element to open said port in response to a rate of increase of coolant pressure above said predetermined value, and means to return the valve element at a controlled rate to a position to close said port.

* * * * *